United States Patent [19]
Lane

[11] 3,809,350
[45] May 7, 1974

[54] VENT MOUNTING DEVICE

[76] Inventor: Byron D. Lane, 415 9th St., S.E., Minot, N. Dak. 58601

[22] Filed: Aug. 14, 1972

[21] Appl. No.: 280,123

[52] U.S. Cl.................. 248/57, 52/219, 138/106
[51] Int. Cl.............................................. F16l 5/00
[58] Field of Search............... 248/57, 56; 52/219; 285/340, 42–44; 138/106, 107

[56] References Cited
UNITED STATES PATENTS

| | | | |
|---|---|---|---|
| 1,127,844 | 2/1915 | Anderson | 248/57 X |
| 2,739,615 | 3/1956 | Wurzel | 285/340 X |
| 3,481,571 | 12/1969 | Lauckner | 248/57 |
| 2,965,342 | 12/1960 | Goldstone | 248/57 |
| 1,342,918 | 6/1920 | Legg | 52/219 X |
| 2,985,091 | 5/1961 | Hatcher | 285/44 X |
| 2,140,441 | 12/1938 | Clark | 248/56 X |
| 1,524,341 | 1/1925 | Davis | 248/56 |

Primary Examiner—Ramon S. Britts
Assistant Examiner—Rodney H. Bonck
Attorney, Agent, or Firm—Clarence A. O'Brien; Harvey B. Jacobson

[57] ABSTRACT

A readily applicable device for use when the user is called upon to install a sheet material vent pipe. It comprises a simple adapter plate having a central opening for insertable and adjustable passage of a conventional type vent pipe, the apertured portion of said plate being encompassed by overhanging coordinating tabs. These tabs have upwardly flexed or canted inner ends which are slightly resilient and which embrace and yieldingly as well as retentively engage that portion of the vent pipe surrounded thereby.

2 Claims, 4 Drawing Figures

PATENTED MAY 7 1974　　　　　　　　　　　　　　　　　3,809,350
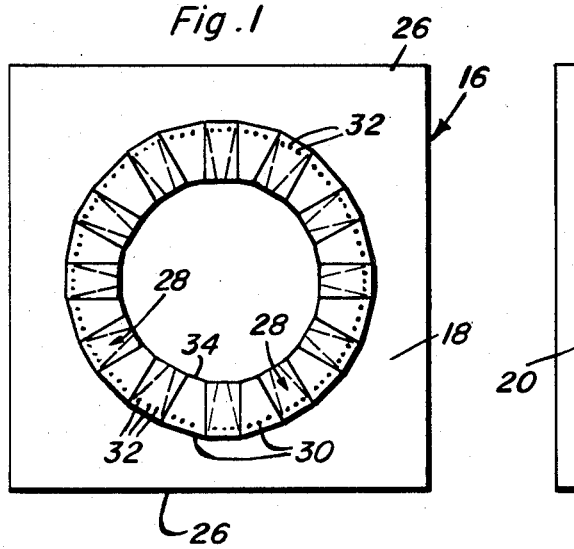
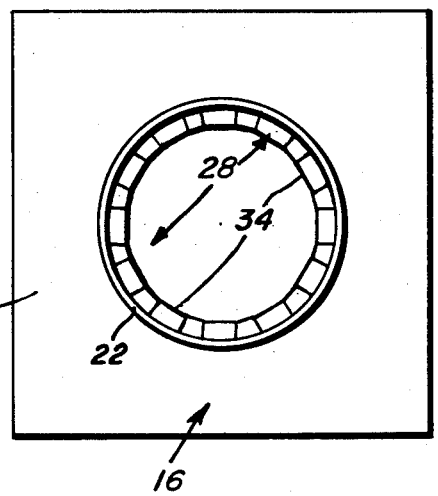
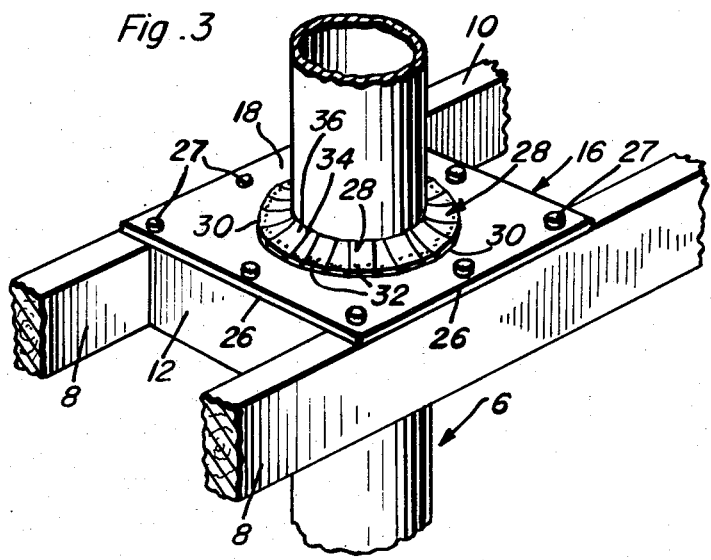
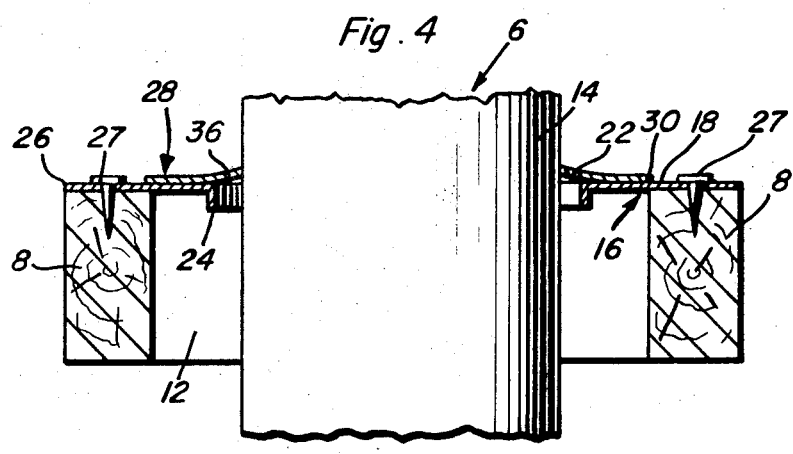

VENT MOUNTING DEVICE

The present invention relates to an accommodating, mounting and reliable retaining device, more particularly, an adaptation which functions to facilitate the step of supportively installing a conventional vent pipe in a building structure and which obviates the need for difficult-to-cope-with manually applicable fastening devices.

More particularly, the concept pertains to a square or equivalent adapter plate the marginal portions of which are nailed to spaced parallel joists and coordinating braces, said plate being not only centrally apertured for passage of the intended portion of the vent pipe but having self-contained pipe-engaging and retaining tabs.

A survey of the broad field of invention to which the herein disclosed concept relates would reveal that it is common practice to utilize split resilient fingers, tongues and tab-type gripping elements which are employed for supportive retention of articles of one type or another and that, in addition, it is old to provide lock washers with spring tongue gripping elements. For guidance and general background information the reader may desire to evaluate and take into account prior U.S. Pat. No. 737,437, of Aug. 25, 1903; U.S. Pat. No. 3,325,193 of June 13, 1967 and perhaps even U.S. Pat. No. 3,413,021 of Nov. 26, 1968.

There has long existed a need for a more satisfactory device for vertically mounting and expeditiously installing vent pipes where, for example, the suspended portion of the pipe has to pass between close spaced parallel joists or timbers with or without cross-braces. The present prevailing procedures require time and labor consuming steps which almost invariably utilize screw-threaded headed fasteners and other manually applicable vent mounting devices. It follows that it is an object of the present invention to advance the art in an acceptable and reliable manner. As will be hereinafter more fully evident, the instant concept brings into use a prefabricated adapter plate having a central flanged or collared opening, more specifically, an opening which is surrounded or encompassed by overhanging inwardly projecting pipe engaging and locking tabs, that is, tabs whose inner free yieldable and upwardly canted free ends satisfactorily embrace and support the vent pipe in the position desired.

In carrying out the principles of the invention the locking tabs, preferably made from a multiplicity of metal pieces of requisite size and shape, are welded in suitably nested relationship and allow the pipe to be slid up but prevent downward movement relative to the support means even when considerable end-thrust weight is applied to the vent pipe. It follows that the pipe is securely erected without becoming undesirably bent or deformed.

Briefly the adapter plate preferably has planar top and bottom surfaces and is made to fit atop the joists and cross-braces so that it can be nailed in place thereon. The flanged central opening permits passage of the smaller vent pipe therethrough. The pipe opening provided by the flange or collar is equipped with a multiplicity of welded tabs, that is, tabs which are welded at their outer ends and have inner free ends which are bent slightly upwardly and which are properly nested and contoured to embrace and securely anchor the vent pipe.

These together with other objects and advantages which will become subsequently apparent reside in thE details of construction and operation as more fully hereinafter described and claimed, reference being had to the accompanying drawings forming a part hereof, wherein like numerals refer to like parts throughout.

FIG. 1 is a top plan view showing the vent mounting device with the vent pipe omitted.

FIG. 2 is a bottom plan view of the same.

FIG. 3 is a fragmentary perspective view showing the device applied and portions of the vent pipe extending above and below the adapter plate as well as the encompassing and retaining tabs.

FIG. 4 is an enlarged detail view which brings out certain features not as clearly evident in the other views.

As shown in FIGS. 3 and 4 the vent pipe is denoted, generally stated, by the numeral 6 and may be construed as conventional and of suitable material and size. The members employed to afford support and anchorage for the vent pipe are those illustrated in FIG. 3 wherein it will be seen that two of these members comprise closely spaced parallel joists or timbers 8 whose top surfaces are coplanar and denoted at 10. The transverse or cross-braces are of like construction and one is shown at 12 in FIG. 3. The upper surfaces of the braces are flush with the surfaces 10. The portion of the pipe which is to be embraced and erected for required use is denoted at 14 (FIG. 4).

One of the component parts of the attachable mounting device is here designated as an adapter plate 16 and it is made of suitable metal or material and supported on the members 8 and 12. The adapter plate may be square or rectangular or perhaps of some other marginal shape. The flat top surface is denoted at 18 and the correspondingly flat bottom surface (FIG. 2) is denoted at 20. FIG. 2 also shows the circular cut-out which provides the aforementioned opening or hole 22 and which functions to permit passage of the upstanding and depending portions of the vent pipe 6. As brought out to advantage in FIG. 4, the centralized opening 22 is provided with a depending endless or annular flange 24 which functions as a stabilizing or reinforcing collar. It will be evident that the diameter of the opening and collar is greater than the outside diameter of the vent pipe whereby to provide the clearance shown in FIG. 4. The outer marginal edges 26 of the adapter plate are flush with the coacting surfaces of the support members 8 and 12 and the edge portions are secured in place by nails or the like 7. To attain the desired end product and the improved end result, novel means is associated with the collared opening (22 and 24) and this means as before suggested comprises a multiplicty of coacting nested and in some instances overlapped tabs. The individual tabs are denoted at 28 and may be either rectangular or wedge-shaped, if necessary. In any event the tabs are closely related and the outer end portions 30 are welded in place preferably using three spot-welds as at 32 in FIG. 1. It may be necessary to slightly contour the inner free ends 34 to better mate with the encompassed surface of the vent pipe. It should be noted in particular that the locking tabs are not only closely nested, the inner free end portions, more specifically, the ends 36 (FIG. 4) are slightly resilient and are curved or canted upwardly. Thus the free ends or tips engage the surfaces of the pipe without distorting the pipe surfaces. Also with this arrangement this prefabricated structure functions to secure the vent pipe (metal Class B) without the aid of manually applicable fastening devices. As a matter of fact, these tabs will allow the the pipe to slide up but will prevent retrograde or downward sliding movement, that is, even when weight from above is applied. It follows that the adapter with the collared opening and associated yieldable tabs provides an innovation which well serves the purposes for which it has been perfected.

The square adapter plate may be cut large enough to allow for one inch fire clearance plus space for nailing or securing, for example, to a sub-floor (not shown). The opening means defined by the free ends of the tabs, is at least 3/16th of an inch smaller than the outside diameter of the pipe. The metal locking tabs may range from 1 inch to 1¼ inches and may have their tip ends contoured to conformingly fit the coacting exterior contour of the metal pipe. The harder one pushes downwardly on the installed pipe, FIG. 3, the tighter the tabs function to achieve the desired locking result.

In actual practice the overall mounting device will be properly prefabricated using suitable materials so that it lends itself to use in conjunction with all standard sizes ranging from 3 inches to 9 inches more or less.

The foregoing is considered is illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. For use when positioning and installing a sheet material vent pipe, an adapter plate of a size and shape capable of being superimposed upon and fastened atop structural timbers, a pair of spaced parallel coplanar suitably braced joists for example, said adapter plate having a centralized opening through which an encompassed portion of said vent pipe is adapted to be passed, and complemental tab means, that part of the plate having said opening being provided with an integral depending flange which constitutes a plate stabilizing collar, said opening and said collar being of a diameter greater than the outside diameter of said pipe and being adapted to be spaced from and free of direct contact with said pipe, said tab means comprising a multiplicity of tabs having bendably resilient free ends flexed and canted upwardly and directly and retentively and supportively engageable with surface portions of said vent pipe, said tabs being separate and independent, having marginal edge portions separably overlapping each other, having outward ends which are superimposed and fastened atop oriented surface portions of said plate, whereby to thus secure the vent pipe without having to use manually applicable headed screw-threaded or equivalent fastening devices.

2. The structure defined in and according to claim 1, and wherein said bendably resilient free ends are capable of yielding responsively to upward pressure in a manner that it is possible to forcibly shove and shift the pipe upwardly but not downwardly.

* * * * *